(12) United States Patent
Ku et al.

(10) Patent No.: US 12,507,982 B2
(45) Date of Patent: Dec. 30, 2025

(54) ULTRASONIC FEMORAL HEAD POSITIONING DEVICE AND HIP-KNEE-ANKLE ANGLE MEASUREMENT SYSTEM

(71) Applicant: Show-Chwan Memorial Hospital, Changhua (TW)

(72) Inventors: Ming-Chou Ku, Taichung (TW); Yuan-Hsin Tsai, Changhua (TW)

(73) Assignee: Show-Chwan Memorial Hospital, Changhua (TW)

( * ) Notice: Subject to any disclaimer, the term of this patent is extended or adjusted under 35 U.S.C. 154(b) by 158 days.

(21) Appl. No.: 18/361,986

(22) Filed: Jul. 31, 2023

(65) Prior Publication Data
US 2024/0041424 A1   Feb. 8, 2024

Related U.S. Application Data

(60) Provisional application No. 63/370,456, filed on Aug. 4, 2022.

(51) Int. Cl.
*A61B 8/08* (2006.01)
*A61B 8/00* (2006.01)

(52) U.S. Cl.
CPC ............ *A61B 8/085* (2013.01); *A61B 8/4254* (2013.01); *A61B 8/463* (2013.01)

(58) Field of Classification Search
CPC ..... A61B 8/085; A61B 8/0875; A61B 8/4254; A61B 8/463; A61B 8/5223
See application file for complete search history.

(56) References Cited

U.S. PATENT DOCUMENTS

| | | | | |
|---|---|---|---|---|
| 2015/0278443 | A1* | 10/2015 | Bogaert | G16H 15/00 705/3 |
| 2015/0320391 | A1* | 11/2015 | Yao | A61B 8/0841 600/424 |
| 2023/0377714 | A1* | 11/2023 | Liarno | G16H 20/40 |

FOREIGN PATENT DOCUMENTS

JP          5523694 B2 *   6/2014

OTHER PUBLICATIONS

Translated copy of JP 5523694 (Year: 2014).*
Pierre A d'Hemecourt et al., "Can Dynamic Ultrasonography of the Hip Reliably Assess Anterior Femoral Head Translation", Clinical Orthopaedics and Related Research, 2018 (Year: 2018).*

* cited by examiner

*Primary Examiner* — Brooke Lyn Klein
(74) *Attorney, Agent, or Firm* — SALIWANCHIK, LLOYD & EISENSCHENK (57) ABSTRACT

The present invention is an ultrasonic femoral head positioning device and hip-knee-ankle (HKA) angle measurement system. The ultrasonic femoral head positioning device includes an ultrasonic image capture unit for obtaining images of the femoral head, a gyroscope to verify the horizontal state of the ultrasonic image capture unit, and a processor coupled to the ultrasonic image capture unit and the gyroscope, the processor configured to receive the image of the femoral head from the ultrasonic image capture unit and a positioning signal generated by the gyroscope, and to overlay a middle reference line and a gravity vertical line on the image of the femoral head accordingly.

14 Claims, 6 Drawing Sheets

ULTRASONIC FEMORAL HEAD POSITIONING DEVICE AND HIP-KNEE-ANKLE ANGLE MEASUREMENT SYSTEM

CROSS REFERENCE TO RELATED APPLICATION

This application claims the benefit of U.S. Provisional Application No. 63/370,456, filed on Aug. 4, 2022, the disclosure of which is incorporated by reference herein in its entirety.

BACKGROUND OF THE INVENTION

1. Field of the Invention

The present invention relates to an ultrasonic femoral head positioning device and a hip-knee-ankle angle measurement system, in particular, a positioning device and a measurement system which can judge the femoral head position and hip-knee-ankle angle through a probe with a gyroscope.

2. Description of Related Art

Total knee Replacement (TKR) surgery for end-stage knee arthritis is one of most commonly practiced surgery in developed countries. Using metal and plastic surface replacing components and the relevant technique developed in the last 5 decades, the survey has benefited millions of patients suffering from disabilities of knee osteoarthritis and rheumatoid arthritis at their later life.

Through the years, the technique of replacing the knee with prosthesis has been involuting for improvement of longevity of the components due to wearing of the interface plastic component during daily activities. The alignment of hip-knee-ankle (HKA) angle is critical to long term survivorship of TKR surgery. It has been proved that the survivorship of the components will last longer if the postoperative angle is between ±3 degrees from neutral (0 degree). HKA is defined as coronal alignment of the center of femoral head (COFH), the knee and the anklebone on the long leg view film. During the process of checking HKA alignment in TKR surgery, the center of the knee is exposed in the wound, the center of anklebone is at the mid-point between two malleoli (this is common practice in TKR surgery), both are easily defined with vision during surgery. However, the center of femoral head is deeply located within the upper end of thigh which is not either visible or palpable. In the traditional TKR surgery, the intramedullary method was used, and an arbitrary angle of 6 degree was usually chosen for the angle of femoral canal and the direction of femoral head for femoral distal cutting, which decided the alignment of femoral prosthesis placement and HKA.

Many efforts have been placed on using computer aided navigation system to help surgeons in reaching the alignment guideline of ±3 degrees from neutral in the past 3 decades. And the accuracy in alignment is improved and clinical results have been encouraging. Despite of the evidences that aided navigation improving the long term clinical survivorship results, the prevalence of computer aided TKR surgery is still low around the world. And it has not been recommended in the American orthopedic society guidelines in the latest version (AAOS 2021). The reasons include high cost of facilities for setup of the services, increased time of surgery and also complications of pin for trackers in the navigation systems especially in osteoporotic bone. Since most of the patients were elderly with some grade of osteoporosis. So far to locate the center of femoral head is only possible using computer-aided navigation technique using computerized Computed Tomography (CT) images or imageless kinematic methods both need trackers rigidly fixed onto the femur and an infrared emission and reflection devices for tracking the movement of the femur.

Therefore, in order to effectively determine the accurate central position of the femoral head, improve the success rate of TKR surgery, and reduce postoperative recovery issues, it is necessary to develop an ideal technical method to address the aforementioned problems.

SUMMARY OF THE INVENTION

Ultrasound imaging application in orthopedics is mainly diagnostic for detection soft tissue lesion which is not easily visible using X ray films. It is used in detection dislocated hip in neonates clinical application of sonographic image during orthopedic surgery is rare and has not been reported in TKR surgery in the past. The objective of the present invention is to provide an ultrasonic femoral head positioning device and HKA angle measurement system. They are used to locate the center of femoral head and measure the HKA angle, enabling surgeons to perform TKR surgery based on the data from both.

One aspect of the present invention provides an ultrasonic femoral head positioning device, the ultrasonic femoral head positioning device comprises an ultrasonic image capture unit, a gyroscope and a processor. The ultrasonic image capture unit is configured to capture an image of a femoral head. The gyroscope is configured to generate a positioning signal representing a posture of the ultrasonic image capture unit. The processor is coupled to the ultrasonic image capture unit and the gyroscope. The processor is configured to receive the image of the femoral head from the ultrasonic image capture unit and a positioning signal generated by the gyroscope, and to overlay a middle reference line and a gravity vertical line on the image of the femoral head accordingly.

Preferably, the ultrasonic femoral head positioning device may further comprise a display configured to display the image of the femoral head captured by the ultrasonic image capture unit, and to display the middle reference line and the gravity vertical line.

Preferably, the image of the femoral head may comprise a crescent shadow, and the center of femoral head corresponds to a midpoint of the crescent shadow.

Preferably, the crescent shadow may be mirrored by the processor to determine the midpoint thereof.

Preferably, the ultrasound femoral head positioning device may further include a housing, the housing may include a correlation scale line group including a femoral length scale line and a hip-knee-ankle angle scale line.

Preferably, when a projection line representing a tibial mechanical axis extension line intersects with the corresponding scale line group, a corresponding hip-knee-ankle angle may be obtained.

Preferably, the tibial mechanical axis extension line may be an imaginary line between a midpoint of two ankle bones and a center of the knee.

Preferably, the ultrasonic image capture unit and the gyroscope are implemented as a hand-held probe.

Preferably, the probe may include a housing and a correlation scale line group including a femoral length scale line and a hip-knee-ankle angle scale line may be disposed on a surface of the housing.

One other aspect of the present invention provides a hip-knee-ankle (HKA) angle measurement system including an ultrasonic femoral head positioning device and a tibial positioning device. The ultrasonic femoral head positioning device includes an ultrasonic image capture unit, a gyroscope and a processor. The ultrasonic image capture unit is configured to capture an image of a femoral head. The gyroscope is configured to generate a positioning signal representing a posture of the ultrasonic image capture unit. The processor is coupled to the ultrasonic image capture unit and the gyroscope. The processor is configured to receive the image of the femoral head from the ultrasonic image capture unit and a positioning signal generated by the gyroscope, and to overlay a middle reference line and a gravity vertical line on the image of the femoral head accordingly. The housing accommodates the ultrasonic image capture unit. A correlation scale line group is provided on the surface of the housing and includes a femoral length scale line and a hip-knee-ankle angle scale line. The tibial positioning device is configured to generate a projection line representing a tibial mechanical axis extension line, which is an extension line between a midpoint of two ankle bones and a center of a knee. When the projection line intersects with the correlation scale line group, by determining the intersection point between the femoral length scale line and the projection line, a corresponding hip-knee-ankle angle can be obtained according to the hip-knee-ankle angle scale line.

Preferably, the tibial positioning device may be a laser emitter, the projection line may be formed by positioning the laser emitter at a projection point of the midpoint of the two ankle bones, and directing a laser light beam towards a projection point of the center of the knee.

Preferably, the tibial positioning device may be a telescopic rod, the projection line may be formed by placing one end of the telescopic rod at a projection point of the midpoint of the two ankle bones, and extending another end of the telescopic rod towards a projection point of the center of the knee.

Preferably, the ultrasonic femoral head positioning device may further comprise a display configured to display the image of the femoral head captured by the ultrasonic image capture unit, and to display the middle reference line and the gravity vertical line.

Preferably, the image of the femoral head may comprise a crescent shadow, and the center of femoral head may correspond to a midpoint of the crescent shadow.

Preferably, the crescent shadow may be mirrored by the processor to determine the midpoint thereof.

Preferably, the ultrasonic image capture unit, the gyroscope and the housing may be implemented as a hand-held probe.

Therefore, by utilizing the present invention, the ultrasonic femoral head positioning device can pin-point the center of femoral head. With the assistance of the projection line and known leg bone length, the HKA angle can be measured. This enables surgeons to perform TKR surgery with improved accuracy in realigning the knee joint, thereby reducing postoperative wear of the artificial knee joint and enhancing the postoperative quality of life for patients.

The aforementioned illustrations are exemplary for the purpose of further explaining the scope of the present invention. Other objectives and advantages related to the present invention will be illustrated in the subsequent descriptions and appended drawings.

BRIEF DESCRIPTION OF THE DRAWINGS

The foregoing features may be combined with the following drawings in various combinations without exclusivity, unless expressly indicated otherwise. Apparently, descriptions of drawings in the following may be some of embodiments of the present invention, those of ordinary skill in the art may derive other drawings based on the following drawings without unduly experiments.

DETAILED DESCRIPTION OF THE PREFERRED EMBODIMENTS

The aforementioned constructions and associated functions and following detailed descriptions are exemplary for the purpose of further explaining the scope of the present invention. Other objectives and advantages related to the present invention will be illustrated in the subsequent descriptions and appended drawings. Furthermore, the present invention may be embodied in various modifications, and descriptions and illustrations are not-limiting.

The present invention provides an ultrasonic femoral head positioning device and HKA angle measurement system. They are used to locate the center of femoral head and measure the HKA angle, enabling surgeons to perform TKR surgery based on the data from both.

Figure 1:
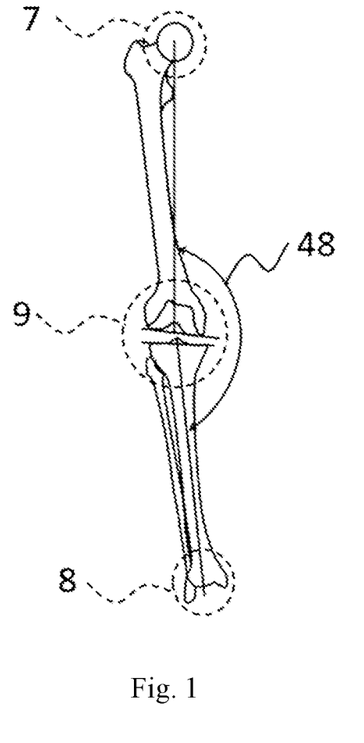
FIG. 1 is a schematic diagram illustrating the HKA angle position of the present invention.

Please refer to FIG. 1. FIG. 1 is a schematic diagram illustrating the HKA angle position of the present invention. Near the center of the knee 9, there is an angle is formed by connecting a straight line from the midpoint of the two ankle bones 8 to the center of the knee 9, and a straight line from the femoral head 7 to the center of the knee 9. The position of this angle represents the HKA angle 48. The position of center of the knee 9 and the position of midpoint of the two ankle bones 8 are easily measure But the femoral head 7 is deeply embedded within the skin and muscles, it's difficultly measure. In order to determine the crucial HKA angle 48 for TKR surgery, it is necessary to accurately measure the center of femoral head 7.

Figure 2A:
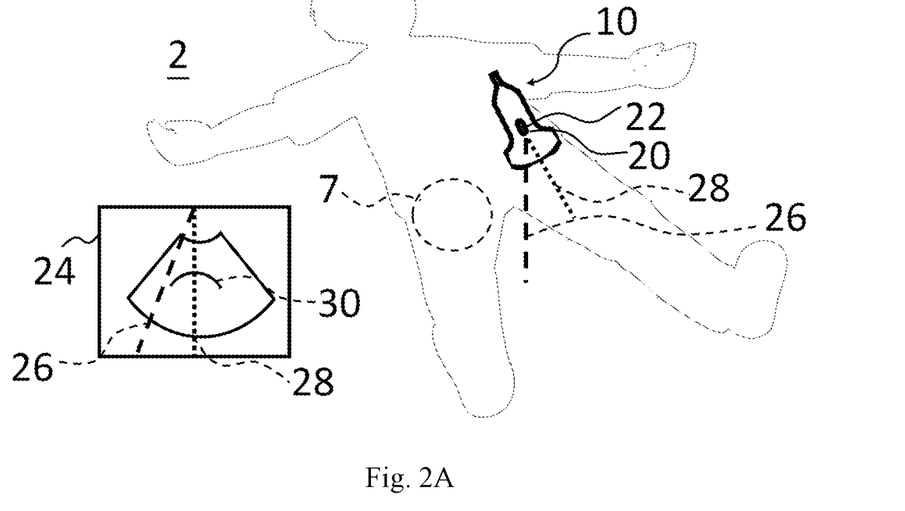
FIG. 2A is a diagram representing the practical application of the ultrasonic femoral head positioning device of the present invention.
Figure 2B:
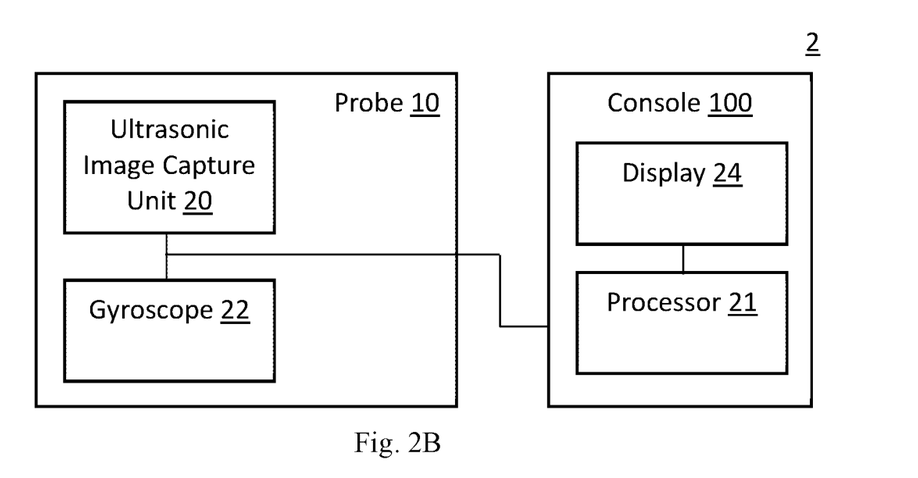
FIG. 2B is a block diagram illustrating an embodiment of the logical structure of the ultrasonic femoral head positioning device of the present invention.

Please refer to FIG. 2A and FIG. 2B. FIG. 2A is a diagram representing the practical application of the ultrasonic femoral head positioning device of the present invention. FIG. 2B is a block diagram illustrating an embodiment of the logical structure of the ultrasonic femoral head positioning device of the present invention. The present invention provides an ultrasonic femoral head positioning device 2 comprises a probe 10 and a console 100. The probe 10 may include an ultrasonic image capture unit 20 and a gyroscope 22. The console 100 may include a processor 21 and a display 24. The processor 21 may be coupling to the ultrasonic image capture unit 20, the gyroscope 22 and the display 24. However, the present is not limited thereto. The processor 21 may be provided within the probe 10, or provided both in the probe 10 and in the console 100.

The probe 10 as shown in the diagram captures the image of the femoral head 7. The gyroscope 22 is configured to generate a positioning signal representing the posture of the probe 10 of the ultrasonic femoral head positioning device 2. The gyroscope 22 may be fixed relative to the ultrasonic image capture unit 20 to confirm whether the ultrasonic image capture unit 20 is in a horizontal state. In this case, when the ultrasonic image capture unit 20 is in a horizontal state and the apex of the crescent shadow 30 of the femoral head 7 in the captured image passes through the middle reference line 28 in the display 24, the center of the physical location of the femoral head 7 can be confirmed.

Furthermore, the display 24 of the ultrasonic femoral head positioning device 2 may display the captured image of the femoral head 7. In one embodiment, the display 24 may be externally disposed to connect to the probe 10 in a wired or wireless manner or integrated with the probe 10, but the present invention is not limited thereto. The processor 21 is configured to receive the image captured by the ultrasonic image capture unit 20 and a positioning signal generated by the gyroscope 22. The processor 21 is further configured to overlay a gravity vertical line 26 and a middle reference line 28 on the captured image, such that the gravity vertical line 26 and the middle reference line 28 may be displayed on the display 24 along with the captured image. The middle reference line 28 may divide the captured image by half such that two parts of the captured image may be symmetrically provided with respect to the middle reference line 28. The processor 21 may generate the gravity vertical line 26 according to the received positioning signal from the gyroscope 22. The gravity vertical line 26 may be a line indicating the direction of gravity in the captured image.

In operation, the ultrasound probe 10 may be disposed directly in front of a normal femoral head 7, and a crescent shadow 30 of anterior cortex of the head may be produced. From the crescent shadow 30, one can find the location of center of femoral head 7 by geometric projection. That is, by using the midpoint of the ultrasound probe perpendicular to the Sagittal plane of the center of femoral head 7, the surgeon can use the midpoint of probe 10 as the surface marker of the center of femoral head 7.

Specifically, the middle reference line 28 guides the user to locate the probe 10 in front of the center of femoral head 7 during surgery, for determining the position of the center of femoral head 7 before the surgeon cuts the femoral condyle or checking the alignment after cutting. The user may first align the middle reference line 28 with the center of the crescent shadow 30 in the captured image such that the middle reference line 28 passes through the apex of the crescent shadow 30, as illustrated in FIG. 2A. The user may then use the gravity vertical line 26 as the reference line and tilt the probe 10 to position the gravity vertical line 26 at the middle of the display 24, while maintaining the middle reference line 28 passing through the apex of the crescent shadow 30. When the gravity vertical line 26 overlaps the middle reference line 28 and the two lines are combined into one line, it is determined that the probe 10 is located right above the center of femoral head 7.

That is, when the probe 10 is located at a position such that the gravity vertical line 26 is coinciding with the middle reference line 28, it indicates that the probe 10 is in a horizontal state and positions directly above the center of femoral head 7. The position of the femoral head 7, as shown in FIG. 1, can be accurately determined, even the femoral head 7 is deeply embedded within the skin and muscles. In other words, the gyroscope 22 of the ultrasonic femoral head positioning device 2 provides the gravity vertical line 26 on the display 24, while the ultrasonic image capture unit 20 provides the middle reference line 28 on the display 24.

Figure 3:
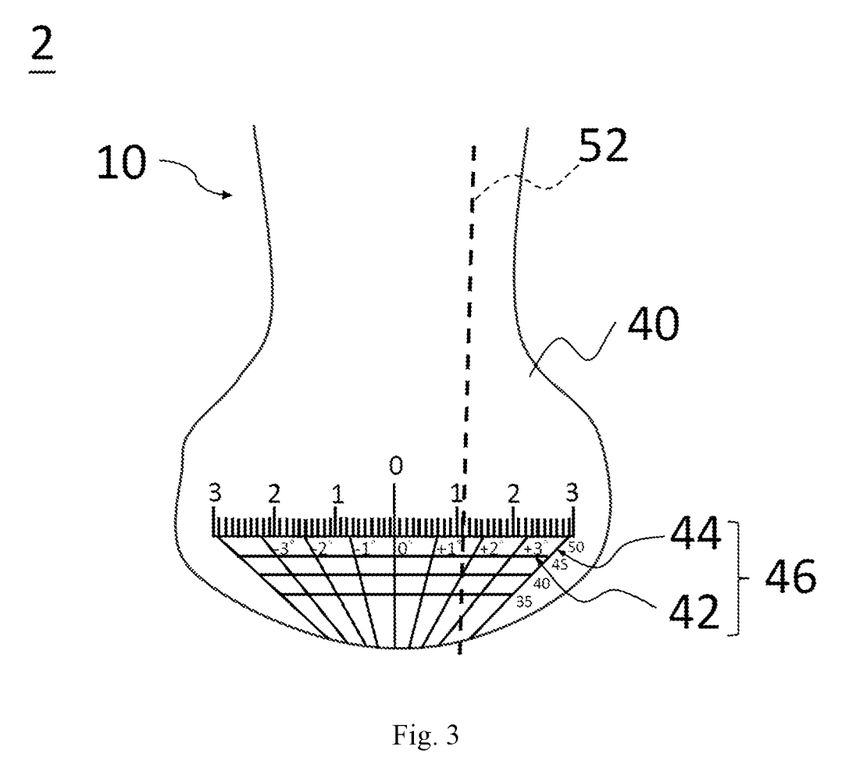
FIG. 3 is a schematic diagram illustrating the probe of ultrasonic femoral head positioning device of the present invention.

Please refer to FIG. 3. FIG. 3 is a schematic diagram illustrating the probe of ultrasonic femoral head positioning device of the present invention. The probe 10 of the ultrasonic femoral head positioning device 2 further includes a housing 40 that forms the viewable portion and the handheld portion. The housing 40 may accommodate the ultrasound image capture unit 20 and the gyroscope 22, but the present invention is not limited thereto. For example, the gyroscope 22 may not be accommodated inside the housing 40. Instead, the gyroscope 22 may be implemented as a standalone dongle and may be attached to or detached from the probe 10. The housing 40 may be disposed with a correlation scale line group 46 on the surface thereof. The correlation scale line group 46 may include a femoral length scale line 42 and a HKA angle scale line 44. The femoral length scale lines 42 illustrated in FIG. 3 may include one or more horizontal lines. With the probe 10 positioned as has been described, that is, aligned with the center of femoral head, and when the projection line 52 representing the tibial mechanical axis extension line intersects with the correlation scale line group 46, the HKA angle may be determined. The femoral length scale line 42 may be one or more horizontal lines each corresponds to a specific femur length. For example, as illustrated in FIG. 3, four horizontal lines are provided, and these horizontal lines are corresponding to femur lengths of 35 cm, 45 cm, 45 cm and 50 cm respectively. However, the present invention is not limited thereto, horizontal lines corresponding to any length between 35 cm to 50 cm may be provided. The HKA angle scale line 44 may be a plurality of radially disposed lines intersecting with the femoral length scale line 42. For example, as illustrated in FIG. 3, nine HKA angle scale lines 44 are provided, and the one at the center, which is a vertical line, represents the HKA angle of 0°. And the rest of the lines with gradually increased inclination with respect to the center line are respectively representing ±1°, ±2°, ±3° and ±4°. However, the present invention is not limited thereto, radial lines corresponding to any angle between 0° and 5° may be provided. To this end, if the patient's femoral length is 40 cm, the intersection point between the femoral length scale line 42 of 40 cm and the tibial mechanical axis extension line 52 can be located. It may be observed that the HKA angle scale line 44 passing through the intersection point is approximately measured +2°. It is ideal for the angle to be within a range of ±3 degrees, as this improves the success rate of the surgery.

Figure 4:
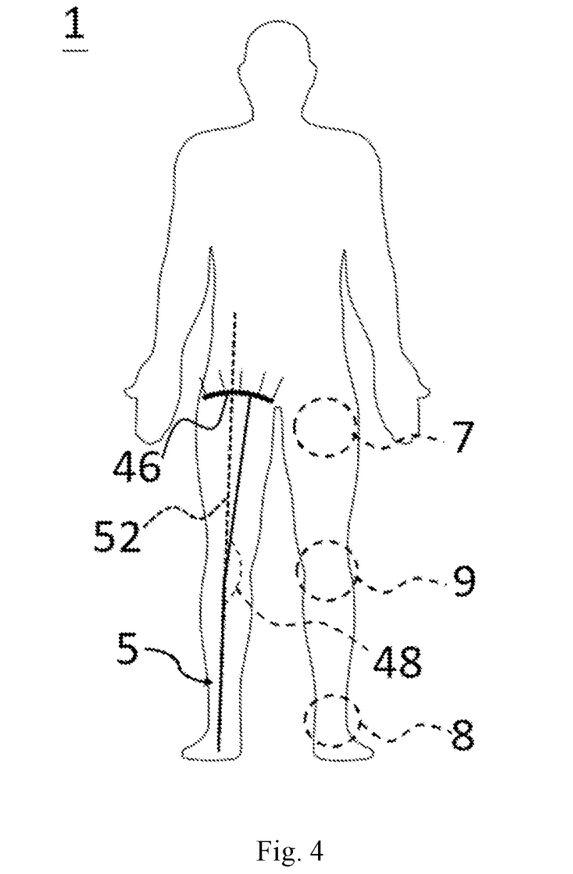
FIG. 4 is a schematic diagram illustrating the HKA angle measurement system of the present invention.

Furthermore, please refer to FIG. 4 and together with FIG. 3. FIG. 4 is a schematic diagram illustrating the HKA angle measurement system of the present invention. The present invention also discloses a HKA angle measurement system 1 comprising an ultrasonic femoral head positioning device 2 which is shown in FIG. 2 and FIG. 3, and a tibial positioning device 5. After the ultrasonic femoral head positioning device 2 positions the femoral head 7, the HKA angle 48 can be further determined by the assistant of the tibial positioning device 5.

Specifically, a tibial mechanical axis extension line is an imaginary line connected between a midpoint of two ankle bones 8 and a center of a knee 9 of a patient's leg. In order to find the HKA angle 48, the tibial positioning device 5 may be disposed near the center of the knee 9 to generate a projection line 52 representing the tibial mechanical axis extension line. When the projection line 52 intersects with the correlation scale line group 46 at the intersection point between the femoral length scale line 42 corresponding to the known femur length and the projection line 52. Then the corresponding HKA angle 48 can be obtained from the degree value on the HKA angle scale line 44 subtracted from 180 degree. The span of the degree value on the HKA angle scale line 44 is preferably able to cover the angle at least in the range of ±3 degrees.

In one embodiment, by calculating the femoral length and the angle formed by the tibial mechanical axis extension line 52 and the femur, an array of distance in mm as the function of femoral length from 35 cm to 50 cm and the angle from 1-5 degrees may be obtained, as in Table 1. The length of the distance represents the length of the distance from the vertex of the tibial mechanical axis extension line to the center of femoral head 7, in which the center of femoral head 7 is aligned at the center of the probe 10, i.e., the position 0 mm.

TABLE 1

| Femur Length | 1 deg | 2 deg | 3 deg | 4 deg | 5 deg |
| --- | --- | --- | --- | --- | --- |
| Tanθ | 0.017 | 0.035 | 0.052 | 0.07 | 0.087 |
| 35 cm | 5.95 | 12.25 | 18.2 | 24.5 | 30.45 mm |
| 40 | 6.8 | 14.0 | 20.8 | 28.0 | 34.8 mm |
| 45 | 7.65 | 15.8 | 23.4 | 31.5 | 39.2 mm |
| 50 | 8.5 | 17.5 | 26.0 | 35.0 | 43.5 mm |

Figure 5:
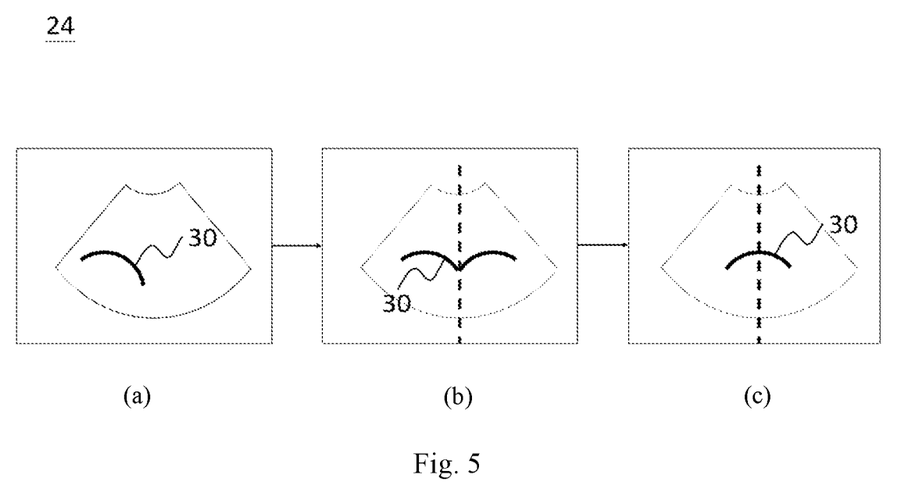
FIG. 5 is a diagram illustrating the method of generating the crescent shadow of the present invention.

Please refer to FIG. 5 together with FIG. 2. FIG. 5 is a diagram illustrates the method of generating the crescent shadow of the anterior cortex of the head of the present invention. Placing ultrasonic femoral head positioning device 2 directly in front of a normal femoral head 7 can easily produce the crescent shadow 30 on the display 24. From the crescent shadow 30, the center of femoral head 7 may be found by geometric projection. Using the ultrasonic femoral head positioning device 2, the surgeon can use the midpoint of the probe of the ultrasonic femoral head positioning device 2 as the surface marker of center of femoral head 7.

As illustrated in FIG. 5 (a), the crescent shadow 30 may be observed in the ultrasonic image of the femoral head 7, and the center of femoral head 7 corresponds to the midpoint of the crescent shadow 30. That is, the crescent shadow 30 corresponds to the shape of the femoral head 7, and by identifying the middle point or apex of the crescent shadow 30, the center of femoral head 7 may be determined.

In order to make it more easy and accurate for the user to identify the middle point of the crescent shadow 30, the function of mirroring the image with respect to the middle reference line 28 is implemented. For example, a software by combining the mirror images of the anterior femoral head crescent shadows 30, see FIG. 5 (b), the most superior point of the femoral head 7 will be pin-pointed while moving the probe 10 transversely on the skin above the anterior hip with the merging of two crescent shows 30 side by side into one on the display 24, see FIG. 5 (c). As the probe 10 moves closer to the center of femoral head 7, the mirrored crescent shadows 30 will be aligned to form a single crescent shadow 30.

According to various embodiments of the present invention, the ultrasonic image on the display 24 which shows the center of femoral head 7 may be rendered through computation with the information from the crescent shadow 30.

The middle reference line 28 representing the center extension line (with the gyroscope 22) of the probe of the ultrasound femoral head positioning device 2 may be illustrated on the display 24. When the middle reference line 28 passes through the center of femoral head 7 and overlaps the gravity vertical line 26 on the display 24, it may be determined that the probe 10 of the ultrasound femoral head positioning device 2 is located directly above the center of the femoral head 7.

Figure 6:
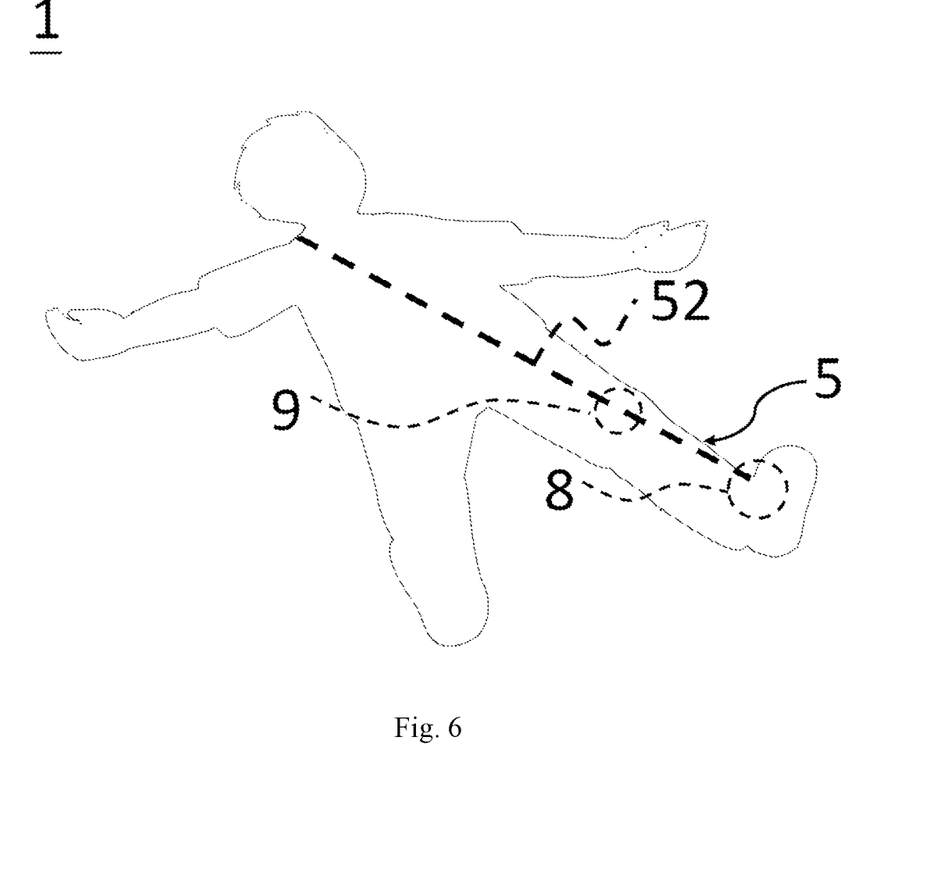
FIG. 6 is a schematic diagram illustrating the tibial positioning device of the present invention.

Please refer to FIG. 6. FIG. 6 is a schematic diagram illustrating the tibial positioning device of the present invention. The tibial positioning device 5 may be a laser emitter. The projection line 52 representing the tibial mechanical axis extension line may be formed by positioning the laser emitter at the projection point of the midpoint of the two ankle bones 8, directing the laser light beam towards the projection point of the center of the knee 9. To this end, the laser light represents the tibial mechanical axis extension line 52.

As an alternative, the tibial positioning device 5 may be a telescopic rod. The projection line 52 may be formed by placing one end of the telescopic rod at the projection point of the midpoint of the two ankle bones 8, and extending the other end of the telescopic rod extended towards the projection point of the center of the knee 9. To this end, the extended telescopic rod represents the tibial mechanical axis extension line.

For example, the surgeon may place a telescopic rod from midpoint of the two ankle bones 8 which is palpable and easily located between the two ankle bones and center of the knee 9 (medial to the tibial tubercle) which is under direct vision through the surgical wound distance between the tip of telescopic rod and center of femoral head 7. The distance can be easily translated into HKA angle 48 by femoral length. The femoral length can be measured from the long leg film preoperatively.

Therefore, by utilizing the present invention, the ultrasonic femoral head positioning device 2 can pin-point the center of femoral head 7. With the assistance of the projection line 52 representing the tibial mechanical axis extension line and the known leg bone length, the HKA angle 48 can be measured. This enables surgeons to perform TKR surgery with improved accuracy in realigning the knee joint, thereby reducing postoperative wear of the artificial knee joint and enhancing the postoperative quality of life for patients.

The descriptions illustrated above set forth simply the preferred embodiments of the present invention; however, the characteristics of the present invention are by no means restricted thereto. All changes, alterations, or modifications conveniently considered by those skilled in the art are deemed to be encompassed within the scope of the present invention set forth by the following claims.

What is claimed is:

1. An ultrasonic femoral head positioning device, comprising:
    an ultrasonic probe configured to capture an image of a femoral head;
    a gyroscope configured to generate a positioning signal representing a posture of the ultrasonic probe; and
    a processor coupled to the ultrasonic probe and the gyroscope, the processor configured to receive the image of the femoral head from the ultrasonic probe and a positioning signal generated by the gyroscope, and to overlay a middle reference line and a gravity vertical line on the image of the femoral head accordingly; and a housing including a correlation scale line group including a femoral length scale line and a hip-knee-ankle angle scale line,
wherein the middle reference line is an extension line dividing the image of the femoral head into two portions, and the two portions of the image are symmetric to each other with respect to the middle reference line, and
wherein the gravity vertical line is a line indicating a direction of gravity.

2. The ultrasonic femoral head positioning device according to claim 1, wherein ultrasonic femoral head positioning device further comprises a display configured to display the image of the femoral head captured by the ultrasonic probe, and to display the middle reference line and the gravity vertical line.

3. The ultrasonic femoral head positioning device according to claim 2, wherein the image of the femoral head comprises a crescent shadow, and a center of the femoral head corresponds to a midpoint of the crescent shadow.

4. The ultrasonic femoral head positioning device according to claim 3, wherein the processor is configured to mirror the crescent shadow to determine the midpoint thereof.

5. The ultrasonic femoral head positioning device according to claim 1, wherein a corresponding hip-knee-ankle angle is obtainable when a projection line representing a tibial mechanical axis extension line intersects with the correlation scale line group.

6. The ultrasonic femoral head positioning device according to claim 5, wherein the tibial mechanical axis extension line is an imaginary line between a midpoint of two ankle bones and a center of the knee.

7. An ultrasonic femoral head positioning device comprising:
an ultrasonic image capturer configured to capture an image of a femoral head;
a gyroscope configured to generate a positioning signal representing a posture of the ultrasonic image capturer; and
a processor coupled to the ultrasonic image capturer and the gyroscope, the processor configured to receive the image of the femoral head from the ultrasonic image capturer and a positioning signal generated by the gyroscope, and to overlay a middle reference line and a gravity vertical line on the image of the femoral head accordingly;
wherein the middle reference line is an extension line dividing the image of the femoral head into two portions, and the two portions of the image are symmetric to each other with respect to the middle reference line,
wherein the gravity vertical line is a line indicating a direction of gravity,
wherein the ultrasonic image capturer and the gyroscope are implemented as a hand-held probe, and
wherein the probe includes a housing and a correlation scale line group including a femoral length scale line and a hip-knee-ankle angle scale line, wherein the correlation scale line group is disposed on a surface of the housing.

8. A hip-knee-ankle angle measurement system, comprising:
an ultrasonic femoral head positioning device, comprising:
an ultrasonic probe configured to capture an image of a femoral head;
a gyroscope configured to generate a positioning signal representing a posture of the ultrasonic probe;
a processor coupled to the ultrasonic probe and the gyroscope, the processor configured to receive the image of the femoral head from the ultrasonic probe and a positioning signal generated by the gyroscope, and to overlay a middle reference line and a gravity vertical line on the image of the femoral head accordingly;
a housing accommodating the ultrasonic probe; and
a correlation scale line group disposed on a surface of the housing and including a femoral length scale line and a hip-knee-ankle angle scale line; and
a tibial positioner configured to generate a projection line representing a tibial mechanical axis extension line, the tibial mechanical axis extension line being an imaginary line connected between a midpoint of two ankle bones and a center of a knee,
wherein a corresponding hip-knee-ankle angle is obtainable via an intersection point between the projection line and the correlation scale line group when the projection line intersects with the correlation scale line group,
wherein the middle reference line is an extension line dividing the image of the femoral head into two portions, and the two portions of the image are symmetric to each other with respect to the middle reference line, and
wherein the gravity vertical line is a line indicating a direction of gravity.

9. The hip-knee-ankle angle measurement system according to claim 8, wherein the tibial positioner is a laser emitter, wherein the projection line is formed by positioning the laser emitter at a projection point of the midpoint of the two ankle bones, and directing a laser light beam towards a projection point of the center of the knee.

10. The hip-knee-ankle angle measurement system according to claim 8, wherein the tibial positioner is a telescopic rod, wherein the projection line is formed by placing one end of the telescopic rod at a projection point of the midpoint of the two ankle bones, and extending another end of the telescopic rod towards a projection point of the center of the knee.

11. The hip-knee-ankle angle measurement system according to claim 8, wherein the ultrasonic femoral head positioning device further comprises a display configured to display the image of the femoral head captured by the ultrasonic probe, and to display the middle reference line and the gravity vertical line.

12. The hip-knee-ankle angle measurement system according to claim 11, wherein the image of the femoral head comprises a crescent shadow, and a center of the femoral head corresponds to a midpoint of the crescent shadow.

13. The hip-knee-ankle angle measurement system according to claim 12, wherein the processor is configured to mirror the crescent shadow to determine the midpoint thereof.

14. The hip-knee-ankle angle measurement system according to claim 8, wherein the ultrasonic probe, the gyroscope and the housing are implemented as a hand-held probe.

* * * * *